United States Patent
Farr

[11] 3,875,483
[45] Apr. 1, 1975

[54] POWER SUPPLY FOR REFRIGERATION UNITS

[75] Inventor: James B. Farr, Ann Arbor, Mich.

[73] Assignee: Tecumseh Products Company, Tecumseh, Mich.

[22] Filed: Aug. 20, 1973

[21] Appl. No.: 389,588

Related U.S. Application Data

[63] Continuation of Ser. No. 214,644, Jan. 3, 1972, abandoned.

[52] U.S. Cl. .................... 318/213, 62/236, 318/227, 321/45 R
[51] Int. Cl. .............................................. H02p 9/44
[58] Field of Search ............ 62/209, 236, 228, 230, 62/243; 318/138, 227, 230, 231, 432, 195, 213; 321/2, 45 R

[56] References Cited
UNITED STATES PATENTS

| | | |
|---|---|---|
| 3,105,180 | 9/1963 | Burnett ............................... 318/231 |
| 3,175,167 | 3/1965 | Lloyd ................................. 318/138 |
| 3,192,464 | 6/1965 | Johnson et al. ...................... 321/2 |
| 3,219,906 | 11/1965 | Keller et al. ........................ 321/2 |
| 3,424,961 | 1/1969 | Leenhouts ........................ 318/696 |
| 3,449,922 | 6/1969 | Ruff et al. ........................... 62/228 |
| 3,515,967 | 6/1970 | McLaughlin et al. ............... 318/138 |
| 3,634,701 | 1/1972 | Studtman ........................ 321/45 R |

Primary Examiner—William H. Beha, Jr.
Attorney, Agent, or Firm—Barnes, Kisselle, Raisch & Choate

[57] ABSTRACT

An electronic power supply which derives power from a DC battery to operate the AC induction motor of a refrigeration compressor unit. The amplitude and frequency of the AC voltage developed by the power supply from the DC battery are functions of the battery voltage. When the battery voltage increases, the amplitude and frequency of the AC voltage for driving the motor increase and vice versa to thereby efficiently operate the motor in spite of fluctuation in the level of battery voltage.

26 Claims, 7 Drawing Figures

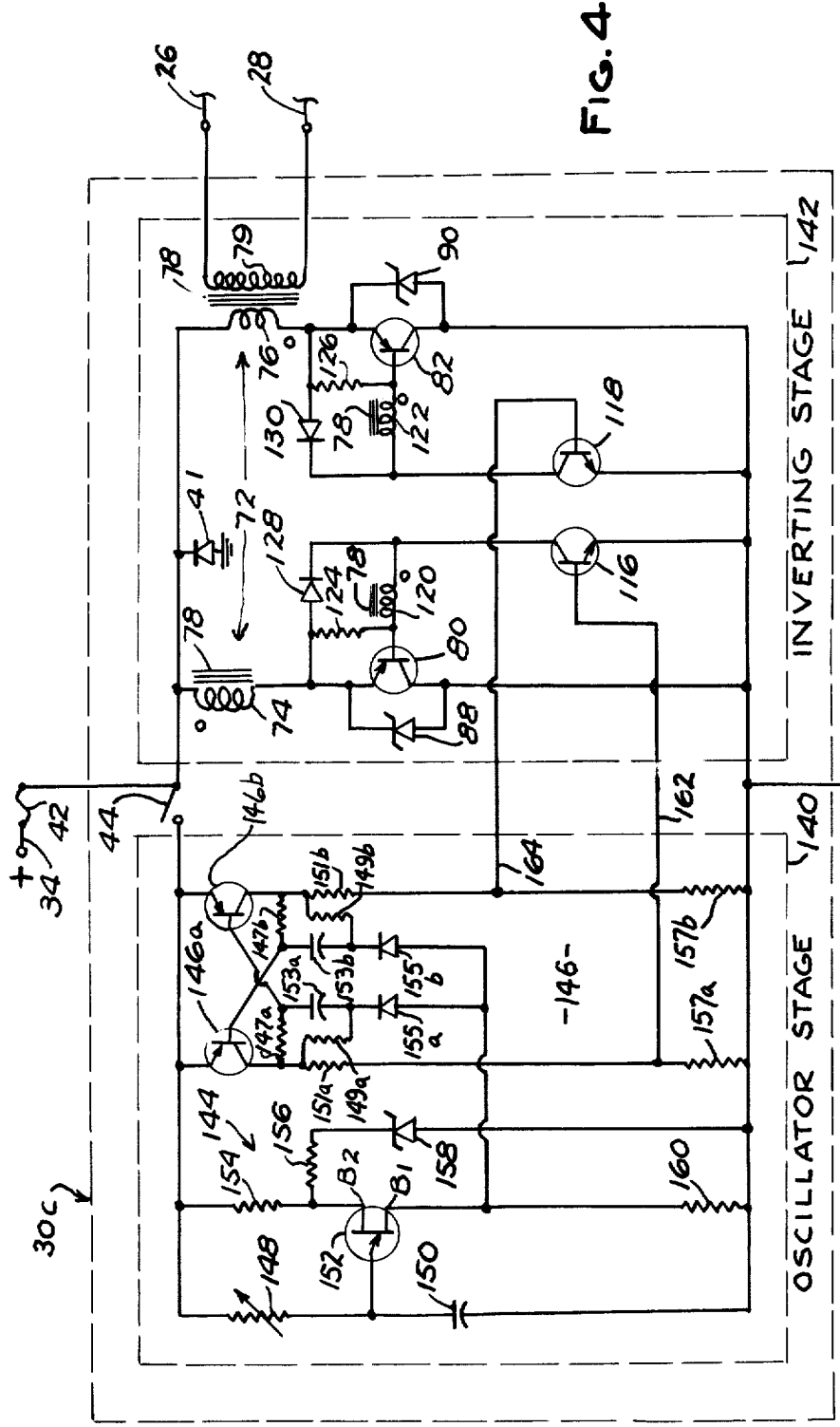
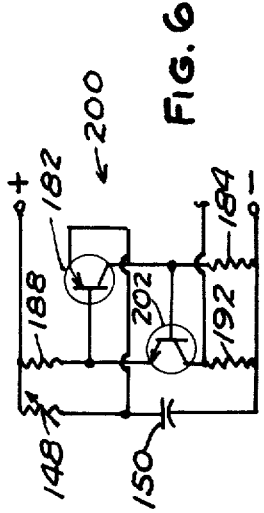
FIG. 4
FIG. 5
FIG. 6

POWER SUPPLY FOR REFRIGERATION UNITS

This is a continuation of application Ser. No. 214,644, filed Jan. 3, 1972, now abandoned.

This invention relates to refrigeration apparatus and more specifically to an electric power supply for driving the refrigeration compressor motor of portable refrigeration units.

In mobile vehicles such as campers or trailers, etc., conventional AC power (115V, 60Hz) is not readily available for operating the AC motor of a portable refrigeration unit installed in the vehicle because the conventional electrical systems for such vehicles are DC, typically 12VDC. Portable AC generators are available for mounting on such vehicles to supply conventional AC power, but these are generally undesirable because they are bulky and relatively expensive. Also available are various inverters which may be connected to the DC electrical systems of the vehicles to develop AC power. In general, these inverters are rather elaborate and also relatively expensive.

An object of the present invention is to significantly reduce the cost of portable refrigeration units of the above type by means of an improved, lowcost inverter. In the past, inverters which have been used to drive the AC motors of portable refrigeration units have been designed to develop conventional AC power without specific consideration for the particular type of load which is to be connected to the inverter. Such inverters are generally designed to deliver AC voltage at rated amplitude and frequency over the expected range of variation in the level of battery voltage to thereby accommodate any AC equipment which operates from 115V, 60Hz power.

The inverter of the present invention is designed specifically for driving the AC induction motor of a refrigeration compressor. The invention is based in part upon the discovery or recognition that by allowing the AC voltage amplitude and frequency delivered to the motor to vary with the level of battery voltage, inefficiency in motor performance is reduced while the inverter can be constructed at significantly reduced cost as compared to presently available inverters which are used in portable refrigeration units. The invention contemplates an inverter which automatically varies the amplitude and frequency of the AC voltage delivered to the compressor motor as controlled functions of the voltage level of the battery so that improved motor operation is achieved. More specifically, during vehicle operation, a 12-volt DC storage battery may deliver voltage anywhere in the range from approximately 9 volts to approximately 14.5 volts depending upon its state of charge and its load. The inverter of the present invention is designed to develop nominal AC voltage (i.e., 115V, 60Hz) at nominal battery voltage (i.e., 12VDC). When the battery voltage increases, the inverter develops increased amplitude and increased frequency of the AC voltage; when the battery voltage decreases, decreased amplitude and decreased frequency. In this way, the inverter reduces, or eliminates, the possibility of loss of motor efficiency which might otherwise occur when the battery voltage deviates from its nominal value. As will be later explained in greater detail, the functional relationship of the amplitude and frequency of the AC voltage developed by the inverter to the magnitude of battery voltage causes the induction motor of the compressor system to be driven with a waveform having a substantially constant volt second product. In this way, the iron core of the induction motor is never driven beyond the design point of flux density and conversely, is never driven far below the design point. Thus, the possibility of excessive motor stator currents, occuring when the battery voltage increases which would generate additional heat in the motor winding, is either reduced or eliminated, as is the possibility of reduced motor torque when the battery voltage decreases.

Continuing further, while one form of inverter can provide substantially directly proportional variation in amplitude and frequency with battery voltage, the invention is not necessarily so limited. Accordingly, the inverter may alternatively be constructed to develop, in response to a change in battery voltage, a change in the frequency of the AC output which differs from the change in the amplitude of the AC output. For example, in an inverter which produces a given percentage decrease in the AC voltage amplitude in response to a given reduction in battery voltage, the reduction in battery voltage may occasion a percentage decrease in the AC voltage frequency which is greater than the given percentage decrease in the voltage amplitude. This is particularly advantageous during starting of the compressor motor because a greater starting torque can be developed at the reduced battery voltage which is occasioned by the motor starting load being reflected through the inverter to the battery.

Other objects, advantages and features of the inverter of the invention will be understood from the ensuing description taken in conjunction with the accompanying drawings which illustrate exemplary, but preferred, embodiments of the invention.

In the drawings:

FIG. 4 is an electrical schematic diagram of a third form of inverter.

FIG. 5 is an electrical schematic diagram of a modification to the circuit of FIG. 4.

FIG. 6 is an electrical schematic diagram of another modification to the circuit of FIG. 4.

Figure 1:
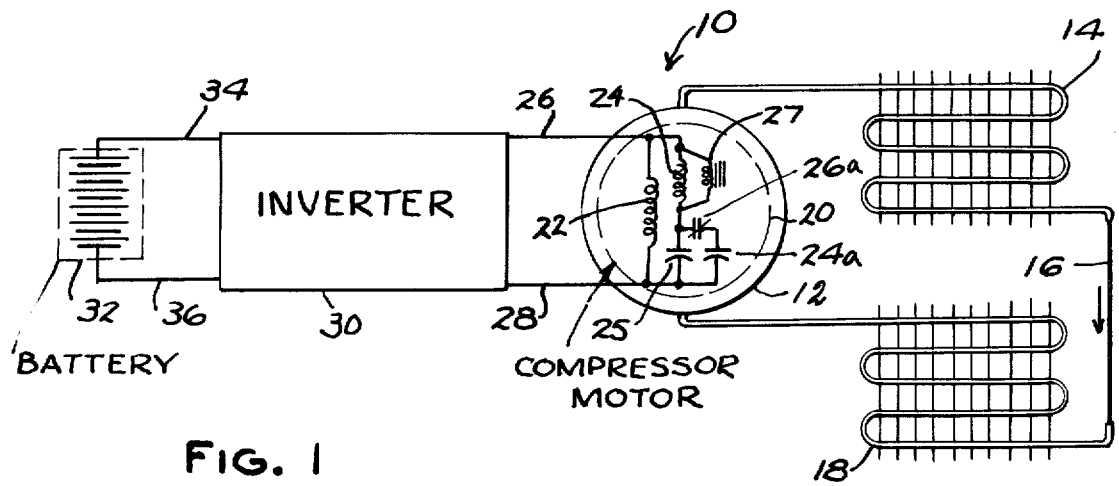
FIG. 1 is a simplified schematic diagram of a portable refrigeration unit which incorporates the electronic power supply of the invention.

A portable refrigeration unit shown in FIG. 1 has a conventional refrigeration system generally designated 10 including the usual hermetically sealed refrigeration compressor unit 12 (for example, a unit of the type shown in U.S. Pat. No. 3,237,848), a condenser 14, a capillary 16 and an evaporator 18. The drive for unit 12 is supplied by an induction motor 20 mounted within the hermetically sealed casing of unit 12. Motor 20 is schematically illustrated as having a main, or run, winding 22 and a start, or auxiliary, winding 24. Main winding 22 is adapted to be electrically connected directly across an AC supply by motor leads 26 and 28 which are respectively connected to the ends of winding 22. For starting the motor, auxiliary winding 24 is adapted to be electrically connected across the AC supply via a start capacitor 24a and a run capacitor 25, which are in parallel with each other. Once the motor comes up to running speed, capacitor 24a is switched out of circuit by the opening of a normally closed relay contact 26a. Contact 26a opens when the voltage developed across start winding 24 reaches a predetermined level as sensed by the potential-sensing relay coil 27. The gas pump or compressor (not shown) of unit 12 compresses gaseous refrigerant returned from evaporator 18 and pumps the same to the condenser 14 in the usual manner. The AC voltage for driving motor 20 is developed by the electronic power supply of the present invention which comprises an inverter circuit 30 and a DC battery 32. Battery 32 is connected via leads 34 and 36 to the input terminals of inverter 30 and the output terminals of inverter 30 are in turn connected to motor 20 via lads 26 and 28.

Figure 2:
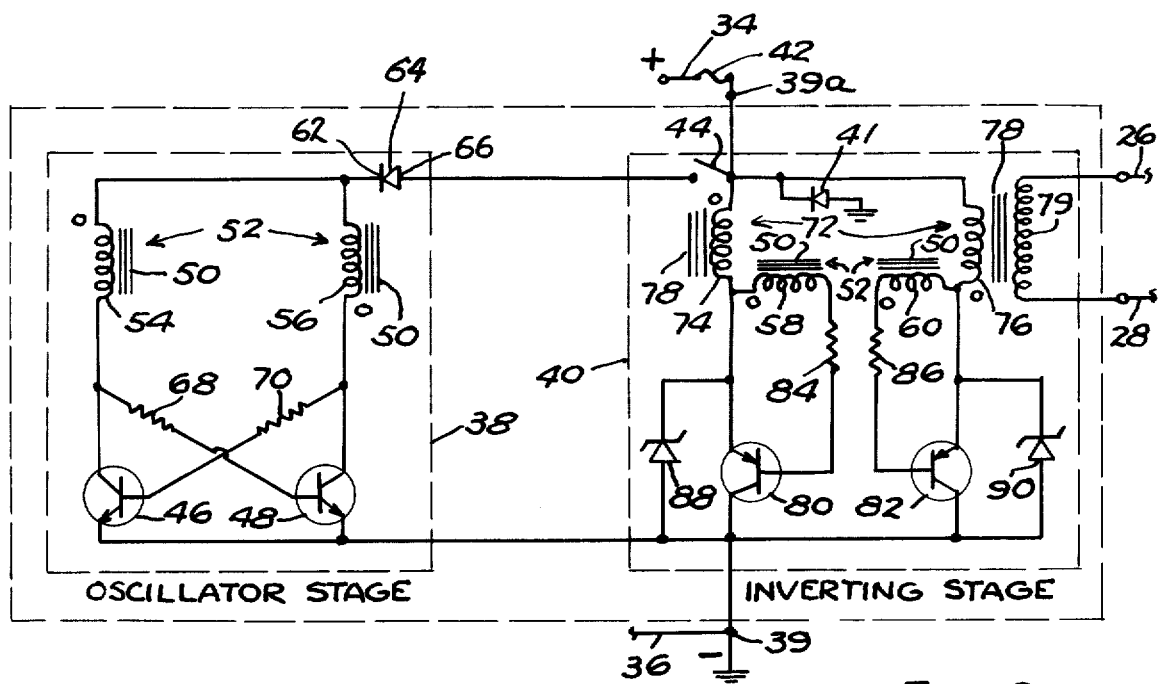
FIG. 2 is an electrical schematic diagram of a first form of inverter used in the power supply of FIG. 1.

A first embodiment of inverter 30 is designated 30a in FIG. 2. Inverter 30a comprises an oscillator stage 38 and an inverting stage 40 which cooperate to vary the amplitude and frequency of the AC output voltage in accordance with the voltage level of battery 32 in a fashion which will be more specifically set forth hereinafter. The positive terminal of battery 32 is conected through a fuse 42 to the positive terminal 39a of inverter 30a while the negative battery terminal is connected to the negative terminal 39b which is grounded. A diode 41 is connected to the load side of fuse 42 for the purpose of blowing fuse 42 should battery 32 be connected in reverse polarity. More specifically, the cathode terminal of diode 41 is connected directly to terminal 39a (the load terminal of fuse 42) while the anode terminal of diode 41 is grounded. Thus, if battery 32 were to be reversely connected (i.e., the positive battery terminal connected to terminal 39b and the negative terminal to terminal 39a), diode 41 would be forward biased to complete a series circuit from the positive battery terminal through the diode and the fuse back to the negative battery terminal. Because the forward biased diode and the fuse present an extremely low impedance across the battery, a high current is conducted through the diode to blow the fuse and thereby protect the remaining circuitry of the inverter from possible damage. It is also to be understood that zener diodes 88 and 90 can also provide this protection feature by conducting current under the above conditions for the purpose of blowing fuse 42, provided diodes 88 and 90 are selected with sufficient surge current capacity for this purpose. However, if circuit requirements dictate use of diodes 88 and 90 which cannot meet this requirement, then the provision of diode 41 is recommended. Inverter 30a is turned on by closing a switch 44 to connect battery 32 to oscillator stage 38. Oscillator stage 38 comprises cross-coupled transistors 46 and 48 which are arranged to develop an oscillating flux in the core 50 of a transformer 52. Transformer 52 has a pair of primary windings 54 and 56 electrically connected in oscillator stage 38 and a pair of secondary windings 58 and 60 electrically connected in inverting stage 40 (core 50 is schematically shown separated in both stages 38 and 40 for clarity). Transformer 52 thus couples oscillator stage 38 with inverting stage 40 by means of the magnetic flux developed in core 50 which links the four windings 54, 56, 58 and 60. As will be subsequently explained, oscillator stage 38 controls the operating frequency of inverting stage 40 via this transformer coupling.

In describing the electrical connection of windings 54 and 56, reference is made to the "dot convention." In accordance therewith, it is to be understood that current flow into the terminal of the winding identified by the dot develops a positive flux in the core on which the winding is wound.

Primary windings 54 and 56 are respectively connected in the collector circuits of transistors 46 and 48, with the dotted terminal of one winding being connected directly to the collector of its associated transistor and the non-dotted terminal of the other winding directly to the collector terminal of its associated transistor. In this case, the dotted terminal of winding 56 is connected to the collector of transistor 48 and the non-dotted terminal of winding 54 to the collector of transistor 46. The other terminal of each winding is connected to the cathode terminal 62 of a diode 64 whose anode terminal 66 is connected back through switch 44 to battery 32. The emitters of the two transistors are tied together and connected to the negative terminal (or ground) of battery 32. Resistor 68 cross-couples the collector of transistor 46 to the base of transistor 48 and resistor 70 likewise the collector of transistor 48 to the base of transistor 46.

Figure 7:
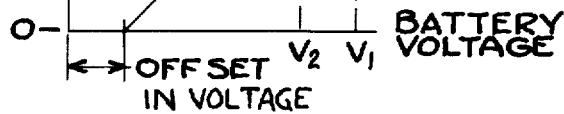
FIG. 7 is a graph useful in understanding one aspect of the invention.

Oscillator stage 38 operates upon closure of switch 44 to produce an oscillatory flux waveform in core 50 of transformer 52 as follows. At first, very small current is drawn from battery 32 through the closed switch 44 and diode 64. This current divides into the two branches of stage 38, a portion passing through winding 54 and the remainder through winding 56. Portions of these two currents are cross-coupled to the bases of transistors 46 and 48. Because the gain characteristics of the transistors are not identical, one of the transistors tends to come on sooner than the other. As the one transistor comes on, the effect is such that the other transistor is held off. For example, assuming that transistor 46 comes on first, the increasing conduction thereof reduces its collector voltage and this is in turn coupled through resistor 68 to prevent transistor 48 from coming on. At the same time, essentially the entire battery voltage is impressed across winding 54 which begins increasing the flux in core 50 in the positive direction. The transformer characteristics are preferably such that the flux now increases substantially linearly toward positive saturation. As core 50 begins to saturate, current flowing through winding 54 and into the collector of transistor 46 increases until transistor 46, with its constant supply of base current, can no longer supply higher collector current. At this time, the collector-emitter voltage of transistor 46 increases and this increased voltage supplies base current through resistor 68 for transistor 48. As transistor 48 turns on, the reduced collector-emitter voltage thereof tends to reduce base current flow through resistor 70 into transistor 46 thereby turning transistor 46 off. Because essentially the entire battery voltage is now impressed across winding 56, the core flux switches toward negative saturation. When the core begins to saturate in the negative direction, transistor 48 is switched off and transistor 46 on in the same fashion as described above so that the cycle may be repeated. Thus the flux waveform in core 50 is generally triangularly shaped. As should be apparent, core 50 saturates more rapidly for higher battery voltages, thereby increasing the frequency of oscillations, and more slowly for lower battery voltages, thereby decreasing the frequency. However, the percentage change in oscillation frequency is not exactly directly proportional to the percentage change in battery voltage. This is because diode 66 and the collector-emitter circuits of transistors 46 and 48 provide substantially constant voltage drops which are substantially independent of the current flow from the battery for the operating range of oscillator stage 38. The voltage impressed across each primary winding 54 and 56 when its associated transistor is conducting is therefore equal to the battery voltage minus the sum of the collector-emitter voltage across the associated transistor and the anode-cathode voltage across diode 64. The effect is such as to create an offset in the graph of oscillation frequency vs. battery voltage, as shown by the graph in FIG. 7. From FIG. 7 it can be seen that the graph plot does not pass through the origin, and therefore, the frequency of oscillation is not exactly directly proportional to battery voltage alone but rather is directly proportional to battery voltage minus the offsetting effect of the voltage drops across the transistor and the diode. The mathematical relationship for the graph plot illustrated in FIG. 7 is set forth in the following formula:

$$f = kE_b - f_o$$

where $f$ = the AC voltage frequency $E_b$ = the battery voltage
$k$ = constant $f_o$ = the offset in frequency Thus, a given percentage change in battery voltage will produce a greater percentage change in frequency of oscillations. This percentage relationship is disclosed in FIG. 7 for the case wherein the battery voltage drops from $V_1$ volts to $V_2$ volts. The oscillation frequency drops correspondingly from $f_1$ hz. to $f_2$ hz., and the algebraic relationship between the percentage change in frequency and the percentage change in battery voltage is given by the formula illustrated in FIG. 7. For very small offsets, as would be the case for oscillator stage 38 operated by a 12VDC battery and having a total voltage drop across diode 62 and the conducting transistor of approximately 1 volt or less, the percentage change in frequency is only slightly greater than the percentage change in battery voltage and therefore, the frequency is substantially proportional to the battery voltage. As will be subsequently seen in further embodiments of the invention, a greater offset produces a correspondingly greater change in frequency for a given change in battery voltage. Moreover, the graph plot need not be a straight line.

Referring now to the details of inverting stage 40, an inverting transformer 72 has two primary windings 74 and 76 and a single secondary winding 79 wound on a magnetic core 78. The two primary windings 74 and 76 are individually connected to individual transistors 80 and 82 respectively. Again, utilizing the "dot convention," the dotted terminal of one primary winding is connected to the emitter of one transistor while the non-dotted terminal of the other primary winding is connected to the emitter of the other transistor. The other terminal of each winding is connected to the positive battery terminal while the collectors of the two transistors are connected to the negative battery terminal. In this case, the non-dotted terminal of winding 74 is connected to the emitter of transistor 80 and the dotted terminal of winding 76 to the emitter of transistor 82. The secondary winding 79 is connected to leads 26 and 28 for supplying AC voltage to motor 20. Resistors 84 and 86 are connected in series with secondary windings 58 and 60 respectively of transformer 52 and across the emitter-base circuits of transistors 80 and 82 respectively. Zener diodes 88 and 90 are connected in shunt with the emitter-collector circuits of transistors 80 and 82 respectively by having their respective cathodes connected to the emitter of their associated transistor and their respective anodes to the collector.

Referring in more detail to the cooperation between inverting stage 40 and oscillator stage 38, and assuming steady-state operation, the connection of secondary windings 58 and 60 of transformer 52 in accordance with the dot convention causes transistors 80 and 82 to alternately switch on and off at substantially equal time intervals in accordance with operation of oscillator stage 38. Assuming that the flux in core 50 of transformer 52 is at a maximum negative portion of its triangularly shaped waveform, oscillator stage 38 causes the flux to begin increasing toward its maximum positive value. The positively increasing flux induces a voltage in winding 58 which biases transistor 80 on and a voltage in winding 60 which biases transistor 82 off. When the flux in core 50 reaches the maximum positive portion of its waveform, oscillator stage 38 operates to reduce the flux back toward its maximum negative value. The negatively decreasing flux now develops voltages in windings 58 and 60 which respectively turn transistor 80 off and transistor 82 on. Thus, oscillator stage 38 alternately switches transistors 80 and 82 on and off at a contolled frequency which is a function of the battery voltage.

Considering now more specifically the operation of inverting stage 40 during steady-state operation, transistors 80 and 82 control current flow in primary windings 74 and 76 of transformer 72 to develop a periodic flux waveform in core 78 which induces AC voltage in secondary winding 79 for driving motor 20.

When transistor 80 turns off, current flow into the dotted terminal of winding 74, which has developed positive flux in core 78, is suddenly blocked. Consequently, further increase of positive flux is prevented and hence the flux waveform is at its maximum instantaneous positive value. Because it is theoretically impossible for the flux in core 78 to change instantaneously, current now flows into the dotted terminal of winding 76 to maintain the core flux. This current flows in a loop back through battery 32 and diode 90, which operates in its forward conduction region. Should there be enough energy stored in the leakage inductance of winding 74 at the time transistor 80 turns off to develop a transient voltage across the winding which exceeds the difference between the zener breakdown voltage of diode 88 minus the battery voltage, then zener diode 88 operates momentarily in its zener region to dissipate this stored energy. Zener diode 88 therefore limits transient voltage across the emitter-collector of transistor 80 to protect the transistor from a condition which otherwise might damage it. It is to be observed that the current flow initially established in winding 76 is of a relatively small time duration because battery 32 immediately tends to reverse its direction. As a result, flux in core 78 now begins to decrease from its maximum positive value toward its maximum negative value in accordance with the changing current in winding 76. Diode 90 operates in its forward conduction region only until current flow into the dotted terminal of winding 76 is reduced to zero. Thereafter, diode 90 is non-conductive while current flow into the non-dotted terminal of winding 76 for developing negative core flux is conducted through the emitter-collector of transistor 82. when oscillator stage 38 operates to turn transistor 82 off and transistor 80 on, the current flow in winding 76, which has developed negative flux in core 78, is suddenly blocked. Zener diode 88 now operates as zener diode 90 did when transistor 80 turned off and transistor 82 turned on, and vice versa so that a current of small time duration flows into the non-dotted terminal of winding 74. This current is subsequently reversed by battery 32 to reverse the core flux. With this arrangement of inverting stage 40, an alternating flux waveform is developed in core 78 so long as switch 44 remains closed.

As will be readily understood, the shape of the oscillatory flux waveform developed in core 70 by the primary circuit of the transformer determines the shape of the AC voltage induced in secondary winding 79. Transformer 72 is therefore designed in accordance with known transformer design criteria with a view to the amplitude characteristic and the frequency characteristic of the AC voltage which is intended to be developed by inverter 30a for application to motor 20 over the operating voltage range of battery 32. The alternate application of battery voltage to primary windings 74 and 76 by operation of transistors 80 and 82 respectively is equivalent to the application of a square wave voltage of alternating polarity to a single primary windings. Assuming an ideal transformer, the output voltage developed in the transformer secondary in response to this square wave input voltage is likewise a square wave voltage. The amplitude of such a secondary voltage is equal to the primary voltage multiplied by the transformer turns ratio, while the frequency is the same as that of the primary voltage. Thus, in the ideal case, the square wave voltage applied to the primary develops a triangular flux waveform in core 78 which in turn induces square wave voltage in secondary 79. Variations from the ideal case may be best described mathematically by the differential equation form of Kirchoff's law of series voltage drops. While the invention contemplates inverters which deviate from the ideal case, it should be appreciated that the preferred construction should approximate the aforementioned ideal circuit. An important advantage of the preferred construction is that the secondary voltage developed in winding 79 lacks any discontinuities which might occur where the operation of the inverting stage results in saturation of transformer core 78.

Turning now to details of the functional relationship between battery voltage and the amplitude and frequency of the AC voltage supplied by inverter 30a to motor 20, it will be understood from the foregoing description that when either transistor 80 or 82 conducts, the application of battery voltage across the associated primary winding 74, 76 changes the flux in core 78 at a rate which is a function of battery voltage minus the voltage drop across the collector-emitter of the conducting transistor. In the ideal case, the amplitude of the square wave AC voltage induced in winding 79 is equal to the battery voltage minus the emitter-collector voltage drop across the conducting transistor 80, 82 times the turns ratio of secondary winding 79 to the primary winding 74, 76 which is being energized. Because the emitter-collector voltage drop is relatively small (less than 0.1 volt except when base drive is inadequate), compared to the nominal voltage of battery 32 (12 volts), the amplitude of the square wave voltage developed in secondary winding 79 is substantially proportional to the battery voltage. One important aspect of the preferred embodiment is the fact that the frequency of the flux waveform in core 78 is entirely independent of the flux in core 78 and is solely controlled by oscillator stage 38. Because the frequency of oscillator stage 38 is solely a function of the voltage of battery 32 for a given configuration of stage 38, the flux waveform developed in core 78 has an amplitude characteristic and a frequency characteristic which are individually selectable functions of battery voltage. This construction permits inverting stage 40 to be designed to vary the amplitude of the AC voltage as a selected function of battery voltage independent of the particular frequency characteristic selected in the design of oscillator stage 38 and conversely oscilltor stage 38 to be designed to vary the frequency oscillator the AC voltage as a selected function of battery voltage independent of the particular amplitude characteristic selected in the design of inverting stage 40. Thus, the way in which the shape of the AC output voltage changes as the battery voltage changes may be selected as desired by the individual designs of oscillator stage 38 and inverting stage 40.

It is to be observed that for operation of inverting stage 40 (assuming an ideal transformer 72), the AC voltage amplitude varies as a substantially linear function of battery voltage and the AC voltage frequency as a substantially linear function of battery voltage, assuming that the offset in the frequency vs. battery voltage graph as shown in FIG. 7 is relatively small compared to the nominal battery voltage.

Zener diodes 88 and 90 improve the operation of inverting stage 40 in two important ways. First, diodes 88 and 90 operate respectively as conventional diodes immediately after switching off of transistors 82 and 80 respectively to provide proper current flow in primary windings 74, 76 for maintaining the instantaneous flux linkage in core 78. Thus, the magnitude of switching transient voltage is reduced from the magnitude which would result if the zener diodes were replaced with conventional diodes, for example. Second, diodes 88 and 90 are adapted to operate respectively as zener diodes immediately after turn off of their associated transistor 80 and 82 to protect the transistor from the voltage induced in the associated primary winding 74, 76 by the collapse of the leakage flux. One further point to be mentioned relates to the transient operation of inverter 30a during start-up. Because the residual fluxes in the respective cores 50 and 78 are of uncertain value, it may happen that the initial cycle or so may not be uniform. However, once this condition passes, inverter 30a operates to develop the controlled AC voltage waveform in secondary winding 79 as described above.

Figure 3:
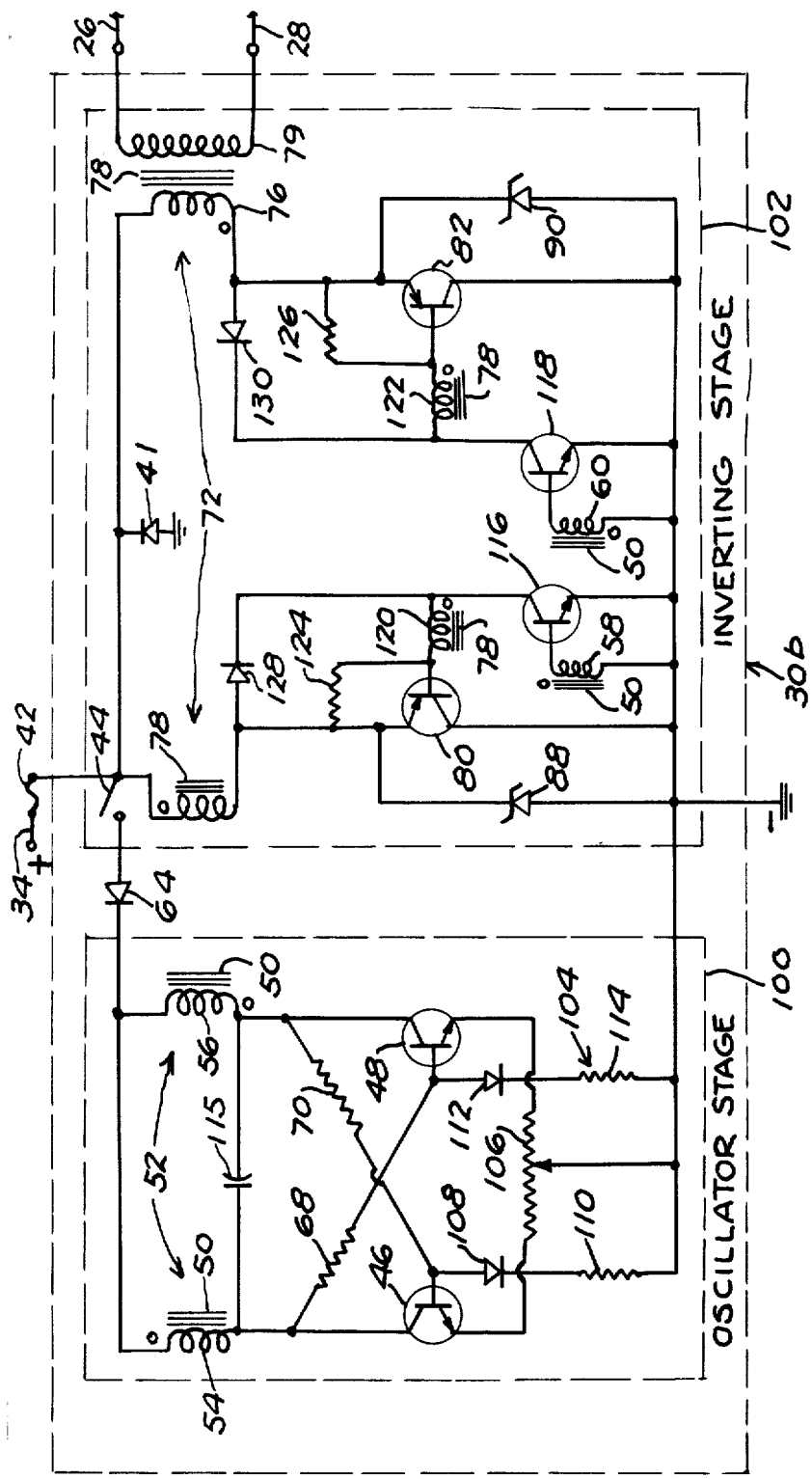
FIG. 3 is an electrical schematic diagram of a second form of inverter.

A second embodiment of the invention illustrated herein is designated 30b in FIG. 3. This embodiment likewise comprises an oscillator stage 100 and an inverting stage 102 which cooperate to develop the AC voltage for motor 20 in accordance with the level of the battery as previously described. However, the individual construction of oscillator stage 100 and inverting stage 102 differ in certain respects from the corresponding stages of the first embodiment. Therefore, while oscillator stage 100 includes transistors 46 and 48 connected in cross-coupled fashion by resistors 68 and 70 to primary windings 54 and 56 of transformer 52 in the same way as in FIG. 2, a balancing circuit 104 is connected to the base-emitter circuits of the two transistors which is adjustable to develop positive and negative half-cycles of exactly equal time duration in the AC voltage supplied to motor 20. Balancing circuit 104 has a potentiometer 106 connected between the emitters of transistors 46 and 48. The wiper of potentiometer 106 is grounded. The base of transistor 46 is connected to ground through a diode 108 and a resistor 110 and similarly the base of transistor 48 through a diode 112 and a resistor 114. Capacitor 115 is preferably connected between the collectors of transistors 46 and 48 to improve the switching operation.

Inverting stage 102 retains transistors 80, 82 and zener diodes 88 and 90 for operating transformer 72 in the same fashion as described in FIG. 2, but the arrangement of the base circuits of transistors 80 and 82 differs. Here, the secondary windings 58 and 60 of transformer 52 are connected across the base-emitter circuit of additional transistors 116 and 118 respectively. Transistors 116 and 118 are associated with transistors 80 and 82 respectively. More specifically, the emitter of each transistor 116, 118 is grounded while the collector of each is electrically connected to the base of its associated transistor 80, 82 via an additional winding 120, 122 of inverting transformer 72. Resistors 124, 126 are shunted across the emitter-base circuit of each transistor 80, 82 respectively, while diodes 128 and 130 are connected from the emitter of each transistor 80 and 82 respectively to the collector of the associated transistor 116, 118. Thus, the circuitry associated with transistor 80 is like that associated with transistor 82 with the exception that windings 58 and 120 which are individual to transistor 80 are oppositely wound on their respective cores 50 and 78 from windings 60 and 122 respectively which are individual to transistor 82. This is indicated by the dot convention in FIG. 3.

Considering now the operation of inverter 30b and assuming steady-state operation and proper circuit balance, oscillator stage 100 develops a generally triangularly-shaped flux waveform in core 50 in the fashion described for oscillator stage 38 of the first embodiment. This flux waveform alternately switches transistors 116 and 118 on and off via windings 58 and 60 respectively. When transistor 116 is switched on, collector current is drawn through winding 74 of transformer 72 and through diode 128. A small amount of current is also drawn through the emitter-base circuit of transistor 80. The turn on of transistor 80 is reinforced by the feedback connection of winding 120 in its base circuit. The increasing flux in core 78 produces a voltage across winding 120 which aids the voltage of battery 32 thereby increasing the rate at which transistor 80 is turned on. This voltage across winding 120 also tends to backbias diode 128 so that current flow into the emitter of transistor 80 increases. With transistor 80 on, the changing flux in core 78 induces one polarity of voltage in secondary 79 in the same fashion as described for the first embodiment, (i.e., one half-cycle of AC voltage). Transistor 82 operates in like fashion in response to turn on of transistor 118 to induce the opposite polarity voltage in secondary 79, (i.e., the other half-cycle). Diodes 88 and 90 operate as in the first embodiment. The resistors 124 and 126 prevent excessive leakage currents from passing through transistors 80 and 82 when switch 44 is open.

Operation of inverter 30b differs from that of inverter 30a in that the possibility of excessive power dissipation in transistors 80 and 82 occurring at start-up because of residual flux in either or both cores 50 and 78 is avoided. Assume the worst case wherein transistors 80 and 46 are the first ones operated in their respective stages and that there is positive residual flux in core 78 and negative residual flux in core 50. Core 78 will therefore be driven more toward positive saturation than it would under steady-state operation. Thus, the induced voltage in winding 120 can possibly drop low enough so that diode 128 loses its reverse bias. As a result, diode 128 can shunt some of the base current of transistor 80, tending to turn it off. Emitter-collector voltage across transistor 80 rises, causing the voltage on winding 74 and consequently on winding 120 to drop. Rising emitter-collector voltage and falling winding voltages cause regenerative switching off of transistor 80 which continues until the emitter-base of transistor 80 is reverse biased. Hence, the possibility of excessive current flow through winding 74 and transistor 80 due to saturation of core 78 is eliminated because the circuit tends to turn transistor 80 off as the core flux increases toward saturation even though transistors 116 remain on. Once the inverter completes a few cycles, the collector currents in transistors 80 and 82 equalize so that they operate in response to operation of transistors 116 and 118 respectively.

Returning now to the balancing circuit of oscillator stage 100, adjustment is performed by the wiper of potentiometer 106. Because of variations in the gains of transistors 46 and 48 and the characteristics of transformer 52, it can happen that one of the transistors 46, 48 remains on longer than the other, thereby maintaining either transistor 80 or 82 on longer than the other. Consequently, the magnetizing currents in transistors 80, 82 respectively become unequal, causing greater heating in one transistor more than the other. The collector current waveforms may be observed on an oscilloscope and potentiometer 106 adjusted to bring the output waveform into symmetry, (i.e., equal half-cycles). Resistors 110 and 114 divert portions of the current headed toward the bases of the respective transistors 46 and 48 and the adjustment of potentiometer 106 directly varies the amounts of base current entering the two transistors so that proper balance can be achieved.

Referring now to FIG. 4, a third embodiment of a power supply of the invention is designated 30c and likewise includes an oscillator stage 140 and an inverting stage 142. However, this embodiment differs from the previous two embodiments in two important respects. First, the coupling from oscillator stage 140 to inverting stage 142 is solely an electrical connection rather than transformer coupling. Secondly, the oscillator frequency is derived by a different arrangement. More specifically, oscillator stage 140 comprises a pulse generator generally designated 144 which supplies pulses to a bistable multivibrator generally designated as 146. Bistable multivibrator 146 switches from a state of conduction via transistor 146a to a stage of conduction via transistor 146b whenever a current pulse flows up through either diode 155a or 155b and capacitor 153a or 153b. The pulse steering in the multivibrator is provided by the stored charge on these capacitors. The stored charge, in turn, is established by the drop across the respective base drive resistors 147a and 147b. For example, if transistor 146a is in the conductive state, current flows down through resistor 151a where a major portion enters the base terminal of transistor 116. With transistor 146a on, transistor 146b is off and the required base drive current for 146a flows through resistor 147b, resistor 151b and resistor 157b. The voltage drop across resistor 147b causes capacitor 153b to charge with a polarity positive toward the base of transistor 146a. With capacitor 153b so charged, the input of a positive voltage pulse across resistor 160 will cause the base current which had existed in transistor 146a to be reduced to zero. Cutting off collector current in transistor 146a causes base drive to be established in 146b so that 146b is turned on and capacitor 153a becomes charged positive at the base terminal of transistor 146b. The next positive pulse across resistor 160 causes transistor 146b to be turned off so that transistor 146a is again put into the conductive state. Pulse generator 144 has a series RC circuit comprising an adjustable resistor 148 and a capacitor 150 connected directly across battery 32. Capacitor 150 is charged at a rate determined by the setting of resistor 148, and while being charged supplies a voltage to the emitter of a unijunction transistor 152. Also connected across the battery is the series string consisting of resistors 154, 156 and a zener diode 158 as illustrated in FIG. 4. The junction of resistors 154 and 156 is connected to the B2 terminal of transistor 152 to deliver a voltage thereto which is a function of the battery voltage. The B1 terminal of transistor 152 is connected through a resistor 160 to ground and also to the input of multivibrator 146. Multivibrator 146 operates by changing state each time a voltage pulse is delivered across resistor 160 by the discharge of capacitor 150 through transistor 152. The connection of multivibrator 146 to transistors 116 and 118 is via leads 162 and 164 respectively. Multivibrator 146 alternately operates transistors 116 and 118 by alternately supplying base current via leads 162, 164 respectively.

Inverter 30c operates as follows. Capacitor 150 is repetitively charged and discharged to deliver pulses across resistor 160 which in turn repetitively switch multivibrator 146. The frequency of the pulses and hence the frequency of multivibrator 146 is an offset function of the voltage of battery 32. More specifically, resistors 154 and 156 bias zener diode 158 for zener operation. Therefore, voltage at the junction of resistors 154 and 156, which is applied to the B1 terminal of transistor 152, is equal to the sum of the zener voltage and the IR drop across resistor 156. Neglecting interbase current, the current flow through resistors 154, 156 and zener diode 158 is proportional to the battery voltage minus the zener diode voltage so that it will be understood that the voltage supplied to the B1 terminal of transistor 152 is an offset function of battery voltage. The firing point for transistor 152 is a function of the B2–B1 voltage and the emitter-B1 voltage and therefore, when capacitor 150 is charged to a sufficient voltage relative to the B1 voltage, transistor 152 fires to discharge capacitor 150 into resistor 160, thereby supplying a voltage pulse for switching multivibrator 146. Because various zener voltages are available depending upon the zener diode selected, pulse generator 144 may be designed to provide a much greater offset in the battery voltage vs. frequency curve shown in FIG. 7. Moreover, where greater offset is provided, the capacitor must be charged to a higher voltage before transistor 152 fires and correspondingly, the exponential charging of capacitor 150 becomes more pronounced so that the graph of oscillator frequency vs. battery voltage becomes substantially less linear.

FIG. 5 illustrates another type of pulse generator 180 suitable for use with multivibrator 146 in oscillator stage 140. Pulse generator 180 also charges capacitor 150 in accordance with the level of battery voltage. However, the capacitor voltage is applied to the emitter of a transistor 182. The collector of transistor 182 is connected through a resistor 184 to ground. The base voltage of transistor 182 is established to be a function of the battery voltage by connecting a zener diode 186 from the junction of resistor 184 and the collector of transistor 182 through a resistor 188 to the positive battery terminal. With this arrangement, resistors 184 and 188 and zener diode 186 comprise a series string across the battery which delivers voltage to the base of transistor 182 which varies as an offset function of battery voltage. A second transistor 190 is connected for operation in response to operation of transistor 182 to develop the necessary voltage pulse to switch multivibrator 146. In particular, the collector of transistor 190 is connected to the junction of zener diode 186 and resistor 188, the base to the junction of zener diode 186, resistor 184 and the emitter of transistor 182 and the emitter through a resistor 192 to ground. When capacitor 150 charges to a voltage slightly above the base voltage of transistor 182 as established by the battery voltage through the aforementioned series string of components, transistor 182 begins to conduct emitter-collector current. A portion of this current goes to the base of transistor 190, turning this latter transistor on. Capacitor 150 therefore discharges through transistor 182 with the result that a voltage pulse is developed across resistor 192 which switches multivibrator 146.

FIG. 6 shows yet another pulse generator 200 for use with the circuit of FIG. 4. The operation of pulse generator 200 is like that of pulse generator 180 in FIG. 5 except that here, the emitter-base junction of a transistor 202 is utilized as a zener diode during a portion of the operating cycle of the pulse generator to develop voltage at the base of transistor 182 which varies in accordance with the level of battery voltage. The circuit of this embodiment operates like that described in FIG. 5 to deliver a pulse to multivibrator 146 when the capacitor 150 is sufficiently charged to develop emitter voltage at transistor 182 which exceeds the base voltage thereof as established by battery 32.

From the foregoing description of the preferred embodiments of the invention, it can be seen that the invention provides a relatively low-cost power supply for portable refrigeration units because the AC voltage developed for driving the AC compressor motor is permitted to vary with the battery voltage. Thus, the more elaborate circuitry of conventional power supplies customarily provided for closely regulating the AC voltage amplitude and frequency is eliminated. The circuitry features of the invention permit the power supply to be designed in accordance with well-known formulations for various models and sizes of AC induction motors. While the invention contemplates various circuit structures wherein the amplitude characteristic and the frequency characteristic of the AC voltage are functions of battery voltage, the preferred embodiments described herein provide efficient operational performance in the following ways.

Because core 78 of inverting transformer 72 is not driven into saturation, discontinuities in the AC voltage delivered to the motor are avoided. Simultaneously, excessive currents in the primary circuit of the transformer due to core saturation are avoided. In the preferred design wherein the amplitude and frequency of the AC voltage developed by the inverter both change substantially in proportion to changes in battery voltage, motor performance and efficiency are maintained in spite of fluctuations in battery voltage because a substantially constant volt second product is applied to the motor winding during each voltage half-cycle.

Explaining more specifically this aspect, it should be apparent that the impedance of a coil whose turns are linked by magnetic material, be it an electromagnet or, as is the instant case, the stator winding of a motor, depends upon the degree of saturation of the magnetic material. Thus, should a voltage be applied to a coil for a length of time sufficient to saturate the magnetic material, an increase in coil current would be observed. If the resistance of the winding is low, the coil current can become very high possibly damaging the coil and/or other circuit structure. In the instant preferred embodiment of the inverter, an AC voltage of nominal amplitude and nominal frequency is intended to be applied to the motor at nominal battery voltage. The volt second product referred to above is the product of nominal voltage amplitude multiplied by the time duration of a nominal voltage half-cycle. By designing the preferred embodiment such that the volt second product developed at nominal battery voltage does not saturate the stator winding of the motor during normal motor operation and so that the volt second product is maintained substantially constant when the battery voltage fluctuates, motor performance and efficiency are maintained should the battery voltage either increase or decrease. That is, should the battery voltage increase from nominal, the increased AC voltage amplitude is applied for a shorter time duration during each voltage half-cycle to thereby prevent saturation and hence, excessive stator current. When the battery voltage drops from nominal, the reduced amplitude voltage is applied for a longer time during each voltage half-cycle and this tends to prevent undue loss of motor torque.

Another advantageous aspect of the preferred embodiment is the independent regulation of the amplitude characteristic and the frequency characteristic of the AC voltage. This allows the oscillator stage to be designed to exhibit a predetermined frequency vs. battery voltage characteristic independent of the design of the inverting stage.

The following list of component values is intended to be exemplary of one embodiment of the invention as illustrated in FIG. 2, and it is to be appreciated that the circuit so defined is merely by way of illustration and not necessarily by way of limitation. The circuit is intended to operate a 1/20 horsepower motor, which is the type of refrigeration compressor motor typically utilized in portable campers, trailers and the like:

| | |
|---|---|
| Compressor 10 | AE1320A, Tecumseh Products Co. |
| Transistor 46 | 2N5296 |
| Transistor 48 | 2N5296 |
| Transformer 52 | |
| Core 50 | Silicon steel, laminated |
| Windings 54, 56 | 86 turns AWG No. 20 copper wire |
| Windings 58, 60 | 14 turns AWG No. 18 copper wire |
| Diode 64 | 1 amp Silicon |

-Continued

| | |
|---|---|
| Resistor 68 | 470Ω |
| Resistor 70 | 470Ω |
| Transformer 72 | |
| Core 78 | Silicon steel, laminated |
| Windings 74, 76 | 30 turns AWG No. 10 copper wire (wound for minimum leakage) |
| Winding 79 | 260 turns AWG No. 19 copper wire |
| Transistor 80 | 2N1522 |
| Transistor 82 | 2N1522 |
| Resistor 84 | .22Ω |
| Resistor 86 | .22Ω |
| Diode 88 | 36 volt zener |
| Diode 90 | 36 volt zener |

I claim:

1. In a refrigeration system and power supply therefor of the type adapted for use in a mobile vehicle such as a camper, a trailer or the like, the combination comprising a refrigeration compressor driven by an AC induction motor, an evaporator coil and a condenser coil operatively connected to said compressor, a DC battery having a nominal battery output voltage that is subject to variation within a predetermined range according to the charge and the load on said battery, and inverter circuit means operably coupling said battery to said motor for energizing said motor with an AC voltage whose amplitude and frequency vary according to preselected functions of battery voltage, said inverter circuit means comprising amplitude control means and frequency control means, said amplitude control means comprising first and second switch means adapted to be alternately rendered conductive in response to first and second switching signals respectively, first output means operatively coupled to said first switch means and said battery so as to be energized when said first switch means is conducting to provide one polarity half cycle of said AC voltage, second output means operatively coupled to said second switch means and said battery so as to be energized when said second switch means is conducting to provide the opposite polarity half cycle of said AC voltage, said amplitude control means being responsive to battery voltage variations within said range for controlling said AC voltage amplitude such that when battery voltage increases within said range said AC voltage amplitude increases according to a first preselected function and when said battery voltage decreases within said range said AC voltage amplitude decreases according to said first preselected function, and wherein said frequency control means comprises signal generating means including oscillator means for generating said first and second switching signals, said signal generating means being coupled to said first and second switch means and also being connected to and powered by said battery and responsive to said battery voltage variations within said range to vary the frequency of said switching signals and thereby vary said AC voltage frequency developed by said first and second output means, said generating means being responsive to battery voltage variations within said range such that when battery voltage increases within said range said AC voltage frequency increases according to a second preselected function and when said battery voltage decreases within said range said AC voltage frequency decreases according to said second preselected function wherein said motor is efficiently operated at different torque loads at said compressor even though said battery voltage varies within said range.

2. The combination set forth in claim 1 wherein said first preselected function and said second preselected function are substantially linear functions and wherein said first and second functions are preselected relative to each other so that half cycles of said AC voltage have substantially equal volt second products even though said battery voltage varies within said range.

3. The combination set forth in claim 1 wherein said motor is a sole electrical load for said inverter circuit means.

4. The combination set forth in claim 1 wherein said first output means comprises a first primary winding of an output transformer, said first switch means is connected to one terminal of said first primary winding so as to conduct current therethrough in a first direction, the other terminal of said first primary winding is connected to said battery, said second output means comprises a second primary winding on said transformer, said second switch means is connected to one terminal of said second primary winding so as to conduct current therethrough in a first direction, and wherein said combination further comprises a diode reversely connected in parallel with said first switch means and poled in a direction to conduct current through said first primary winding in an opposite current direction, said oppositely directed current in said first primary winding being caused by flux developed by said second primary winding in response to current flow therethrough in said first current direction when said second switch means is conducting.

5. The combination set forth in claim 4 wherein said diode is a Zener diode.

6. A power supply circuit for use with a refrigeration system having a compressor unit driven by an AC induction motor wherein said circuit is to be energized by a DC battery to supply said motor with an AC voltage whose amplitude and frequency are varied as controlled functions of variations in battery voltage, said amplitude and said frequency increasing with increasing battery voltage and vice versa, said power supply circuit comprising an inverting transformer having a secondary winding adapted to be connected to said motor and further having first and second primary windings, first and second switching transistors associated with said first and second primary windings respectively with each of said transistors having a first terminal of its emitter-collector circuit connected to a first terminal of its associated primary winding and a second terminal of its emitter-collector circuit adapted to be connected to one terminal of said battery, means adapted to connect the second terminals of each primary winding to the other terminal of said battery, said first primary winding being arranged such that current flow therethrough when its associated switching transistor is conducting causes a positive flux to be developed in said secondary winding and said second primary winding being arranged such that current flow therethrough when its associated switching transistor is conducting causes a negative flux to be developed in said secondary winding, first and second additional transistors associated with said first and second switching transistors respectively and being operatively coupled in the base circuit of its associated switching transistor to control conduction thereof in response to periodic switching signals, oscillator means adapted to be connected to said battery and operable to generate said switching signals at an oscillation frequency that varies as a controlled function of battery voltage, coupling circuit means connecting said switching signals to the base-emitter circuits of said first and second additional transistors, and wherein said oscillator means, said coupling circuit means, said additional transistors and said switching transistors are arranged such that said switching transistors are rendered alternately conductive via their associated additional transistor in response to said switching signals to thereby alternately energize said primary windings, and said inverting transformer comprises first and second additional windings associated with said first and second primary windings respectively and wound such that opposite polarity voltage is simultaneously induced across each additional winding between corresponding terminals thereof by changing flux in said inverting transformer, each of said additional windings being electrically connected to its associated switching transistor such that when its associated switching transistor is initially rendered conducting to thereby initially energize its associated primary winding the voltage induced in the associated additional winding by the initial energization of the associated primary winding tends to increase the conduction of the associated switching transistor.

7. The combination set forth in claim 6 further comprising first rectifier means reversely connected in parallel with said first switching transistor and poled to conduct current through said first primary winding in a direction opposite to current through said first winding and said first switching transistor, and second rectifier means reversely connected in parallel with said switching transistor and poled to conduct current through said second primary winding in a direction opposite to current through said second winding and said second switching transistor.

8. A power supply circuit for use with a refrigeration system having a compressor unit driven by an AC induction motor wherein said circuit is to be energized by a DC battery to supply said motor with an AC voltage whose amplitude and frequency are varied as controlled functions of variations in battery voltage, said amplitude and said frequency increasing with increasing battery voltage and vice versa, said power supply circuit comprising an inverting transformer having a secondary winding adapted to be connected to said motor and further having first and second primary windings, first and second switching transistors associated with said first and second primary windings respectively with each of said transistors having a first terminal of its emitter-collector circuit connected to a first terminal of its associated primary winding and a second terminal of its emitter-collector circuit adapted to be connected to one terminal of said battery, means adapted to connect the second terminals of each primary winding to the other terminal of said battery, said first primary winding being arranged such that current flow therethrough when its associated switching transistor is conducting causes a positive flux to be developed in said secondary winding and said second primary winding being arranged such that current flow therethrough when its associated switching transistor is conducting causes a negative flux to be developed in said secondary winding, first and second additional transistors associated with said first and second switching transistors respectively and being operatively coupled in the base circuit of its associated switching transistor to control conduction thereof in response to periodic switching signals, oscillator means adapted to be connected to said battery and operable to generate said switching signals at an oscillation frequency that varies as a controlled function of battery voltage, coupling circuit means connecting said switching signals to the base-emitter circuits of said first and second additional transistors, and wherein said oscillator means, said coupling circuit means, said additional transistors and said switching transistors are arranged such that said switching transistors are rendered alternately conductive via their associated additional transistor in response to said switching signals to thereby alternately energize said primary windings, and said oscillator means comprises bistable multivibrator means and pulse generating means adapted to be connected to the battery, said means connecting said oscillator means to said first and second electronic switches comprises means connecting said multivibrator means to said first and second switches, said oscillator means includes means connecting said pulse generating means to said multivibrator means and adapted to switch said multivibrator means between states to thereby alternately operate said first and second switches, said pulse generating means comprises means operable in accordance with the level of battery voltage for developing pulses at a frequency related to battery voltage and means for applying said pulses to said multivibrator means to cause said multivibrator means to change state in response to each pulse developed by said pulse generating means whereby said first and second switches are operated at a frequency related to battery voltage and are each operated for substantially equal durations for a given level of battery voltage.

9. In a refrigeration system, the combination comprising a refrigeration compressor driven by an AC induction motor, an evaporator coil and a condenser coil operatively connected to said compressor, a DC battery whose output voltage is subject to variation within a predetermined range according to the charge and the load on said battery, and inverter circuit means operably coupling said battery to said motor for energizing said motor with an AC voltage whose amplitude and frequency are preselected functions of battery voltage, said inverter circuit means comprising first and second switch means adapted to be alternately rendered conductive in response to first and second switching signals respectively, first output means operatively coupled to said first switch means and said battery so as to be energized when said first switch means is conducting to provide one polarity half cycle of said AC voltage, second output means operatively coupled to said first switch means and said battery so as to be energized when said second switch means is conducting to provide the opposite polarity half cycle of said AC voltage, said first and said second switch means being arranged and constructed so that when battery voltage increases within said range said AC voltage amplitude increases according to a first preselected function and when said battery voltage decreases within said range said AC voltage amplitude decreases according to said first preselected function, and signal generating means, including oscillator means and being coupled to said first and second switch means, for generating said first and second switching signals, said signal generating means also being connected to said battery and being arranged and constructed so that when battery voltage increases within said range said AC voltage frequency increases according to a second preselected function and when said battery voltage decreases within said range said AC voltage frequency decreases according to said second preselected function, and wherein said signal generating means includes reference means for developing a substantially constant reference voltage and means responsive to a voltage differential between said battery voltage and said reference voltage to vary the frequency of said oscillator and thereby vary the frequency of said switching signals whereby said motor is efficiently operated at different torque loads at said compressor even though said battery voltage varies within said range.

10. The combination set forth in claim 9 wherein said first output means includes a first primary winding, said second output means includes a second primary winding, said first and said second primary windings being magnetically coupled to a secondary winding so as to develop said AC voltage therein, said first switch means including first and second electronic switching means, said second switch means comprising third and fourth electronic switching means, each of said first, second, third and fourth switching means having a pair of main electrodes and a control electrode for controlling conduction through its main electrodes, said second switching means being operatively connected to said control electrode of said first switching means so as to control conduction thereof in response to said first switching signal at said control electrode of said second switching means, said fourth switching means being operatively connected to said control electrode of said third switching means so as to control conduction thereof in response to said second switching signal and wherein said first primary winding is connected in series with said main electrodes of said first switching means across said battery, and said second primary winding is connected in series with said main electrodes of said third switching means across said battery.

11. The combination set forth in claim 10 wherein said first primary winding has one terminal thereof connected to said battery and the other terminal thereof connected to one of said main electrodes of said first switching device, a first feedback winding magnetically coupled to said first primary winding and electrically coupled between said control electrode of said first switching means and one of said main electrodes of said second switching means, a diode electrically connected between said other terminal of said first primary winding and said one main electrode of said second switching means, and a resistor electrically connected between said other terminal of said first primary winding and said control electrode of said first switching means.

12. In the combination of a refrigeration compressor unit driven by an AC induction motor, a DC battery and inverter circuit means operatively coupling said motor to said battery, the improvement wherein said inverter circuit means is operable in response to a DC battery voltage to develop an AC voltage for said motor wherein the amplitude and the frequency of said AC voltage are functions of said battery voltage, said frequency and said amplitude increasing with increasing battery voltage and vice versa, said inverter circuit means comprising transformer means having primary winding means, secondary winding means and magnetic circuit means linking said primary winding means and said secondary winding means, switching means electrically connected between said battery and said primary winding means and operable in response to periodic switching signals to switch between first and second states for effecting first and second connections respectively of said battery to said primary winding means so that when said switching means is in its first state the flux in said magnetic circuit means changes in one direction and when said switching means is in its second state the flux changes in the other direction to thereby develop said AC voltage in said secondary winding means with said AC voltage having an amplitude which varies as a function of battery voltage, means electrically connecting said secondary winding means to said motor for supplying said AC voltage thereto, oscillator means operatively coupled to said battery for developing said periodic switching signals at an oscillation frequency which varies as a function of battery voltage, and coupling circuit means operatively connecting said switching signals from said oscillator means to said switching means to switch said switching means at a frequency equal to said oscillation frequency, said oscillator means comprising balancing means for balancing the switching operation at said switching means between said first and second states so that said switching means operates for substantially equal time intervals in each of its two states whereby opposite polarity half cycles of said AC voltage may be balanced.

13. The combination set forth in claim 12 wherein said balancing means comprises pulse generating means for timing said oscillation frequency at each half cycle thereof so as to effect said operation of said switching means for substantially equal time intervals in each of its two states, said pulse generating means being connected to said battery and operable in response to variations in battery voltage to vary the repetition rate of said pulses and thereby vary said oscillation frequency as a function of battery voltage.

14. The combination set forth in claim 13 wherein said pulse generating means further comprises reference means for developing a substantially constant reference voltage and means for varying said repetition rate of said pulse generating means in response to voltage differences between said battery voltage and said reference voltage to thereby vary said oscillation frequency as a function of battery voltage.

15. The combination set forth in claim 13 wherein said pulse generation means comprises a free-running oscillator whose frequency is twice said oscillation frequency of said oscillator means.

16. The combination set forth in claim 12 wherein said oscillator means further comprises reference means for developing a substantially constant reference voltage, and means responsive to voltage differences between said battery voltage and said reference voltage to vary said oscillation frequency as a function of battery voltage.

17. The combinataion set forth in claim 12 wherein said oscillator means comprises free-running multivibrator means having first and second alternately conducting switch means each of which has a pair of main electrodes for conducting current therethrough and wherein said balancing means comprises variable impedance means connected in circuit with like electrodes of each of said switch means and said battery such that said impedance means may be varied to thereby vary relative conduction times of said first and second switch means and balance said switching operation.

18. In the combination of a refrigeration compressor unit driven by an AC induction motor, a DC battery and inverter circuit means operatively coupling said motor to said battery, the improvement wherein said inverter circuit means is operable in response to a DC battery voltage to develop an AC voltage for said motor wherein the amplitude and the frequency of said AC voltage are functions of said battery voltage, said frequency and said amplitude increasing with increasing battery voltage and vice versa, said inverter circuit means comprising transformer means having primary winding means, secondary winding means and magnetic circuit means linking said primary winding means and said secondary winding means, switching means electrically connected between said battery and said primary winding means and operable in response to periodic switching signals to switch between first and second states for effecting first and second connections respectively of said battery to said primary winding means so that when said switching means is in its first state the flux in said magnetic circuit means changes in one direction and when said switching means is in its second state the flux changes in the other direction to thereby develop said AC voltage in said secondary winding means with said AC voltage having an amplitude which varies as a function of battery voltage, means electrically connecting said secondary winding means to said motor for supplying said AC voltage thereto, said inverter circuit means further comprising oscillator means operatively coupled to said battery for developing said periodic switching signals at an oscillation frequency which varies as a function of battery voltage, and coupling circuit means operatively connecting said switching signals from said oscillator means to said switching means to switch said switching means at a frequency equal to said oscillation frequency, and wherein said oscillator means comprises reference voltage means for supplying a substantially constant reference voltage, said oscillator means being responsive to the voltage differential between said battery and said reference voltage means for repetitively switching said switching means between said first and second states at an oscillation frequency related to the differential between battery voltage and the voltage of said reference voltage means.

19. The combination set forth in claim 18 wherein said oscillator means further comprises pulse generating means for timing said oscillation frequency at each half cycle thereof so as to effect said operation of said switching means for substantially equal time intervals in each of its two states, said pulse generating means being connected to said battery and responsive to said reference voltage means to vary said repetition rate.

20. In the combination of a refrigeration compressor unit driven by an AC induction motor, a DC battery and inverter circuit means operatively coupling said motor to said battery, the improvement wherein said inverter circuit means is operable in response to a DC battery voltage to develop an AC voltage for said motor wherein the amplitude and frequency of said AC voltage are functions of said battery voltage, said frequency and said amplitude increasing with increasing battery voltage and vice versa, said inverter circuit means comprising transformer means having first and second primary winding means and secondary winding means wound on magnetic circuit means, first and second electronic switch means each of which has a pair of main electrodes and a control electrode for controlling conduction through said main electrodes, said first switch means having its main electrodes connected between said battery and said first primary winding means, said second switch means having its main electrodes connected between said battery and said second primary winding means, third and fourth electronic switch means associated with said first and second switch means respectively, each of said third and fourth switch means having a pair of main electrodes and a control electrode for controlling conduction through its main electrodes, said third switch means being operatively coupled to said control electrode of its associated first switch means to render said first switch means conductive in response to a first periodic switching signal, said fourth switch means having its main electrodes operatively connected in circuit with said control electrode of its associated second switch means to render said second switch means conductive in response to a second periodic switching signal, said first and second primary winding means being arranged on said magnetic circuit means so that a flux of one polarity is developed therein when said first switch means is rendered conductive in response to said first switching signal and a flux of an opposite polarity is developed when said second switch means is rendered conductive in response to said second switching signal, and wherein said combination further comprises oscillator means for developing said first and second periodic switching signals at an oscillation frequency which varies as a function of battery voltage, coupling circuit means operatively connecting said switching signal from said oscillator means to said third and fourth switch means so as to render said first and second switch means alternately conductive, and first and second additional winding means on said magnetic circuit means, said first additional winding means being connected in circuit with said third switch means and said control electrode of said first switch means so as to assist said first switch means being rendered conductive by said third switch means and said second additional winding means being connected in circuit with said fourth switch means and said control electrode of said second switch means so as to assist said second switch means being rendered conductive by said fourth switch means.

21. The combination set forth in claim 20 wherein said first, second, third and fourth switch means are respective first, second, third and fourth transistors, said battery has a pair of output terminals, said first primary winding is connected in series with the emitter-collector circuit of said first transistor across said output terminals said second primary winding means is connected in series with the emitter-collector circuit of said second transistor across said battery terminals, said first additional winding means has one terminal connected to the base of said first transistor and the other terminal thereof connected to the emitter-collector circuit of said third transistor, said second additional winding means has one terminal connected to the base of said second transistor and the other terminal therof connected to the emitter-collector circuit of said fourth transistor.

22. The combination set forth in claim 21 wherein the emitter of said first transistor is connected to one terminal of said first primary winding, a rectifier is connected between said one terminal of said first primary winding and said other terminal of said first additional winding, and a resistor is connected between said one terminal of said first primary winding and said base of said first switching transistor.

23. The combination set forth in claim 20 wherein said oscillator means, said coupling means and said first, second, third and fourth transistors are arranged and constructed such that said first switch means is rendered conductive via said third switch means in response to said first switching signal when said second switch means is rendered nonconductive via said third switch means in response to said second switching signal and said first switch means is rendered nonconductive via said third switch means in response to said first switching signal when said second switch means is rendered conductive via said fourth switch means in response to said second switching signal.

24. The combination of claim 6 wherein the terminals of one pair of corresponding terminals of said additional windings are respectively connected to the base terminals of said first and second switching transistors respectively and the terminals of the other pair of corresponding terminals of said additional windings are respectively connected to said first and second additional transistors respectively and further including first and second diodes associated with said first and second additional windings respectively, each of said diodes having one terminal connected to the junction of its associated additional winding and its associated additional transistor, and each of said diodes having its other terminal connected to the emitter terminal of its associated switching transistor whereby when the voltage induced in each additional winding by its associated primary winding drops to permit forward conduction of the associated diode, the associated diode shunts current from the base circuit of the associated switching transistor to increase the collector-emitter voltage thereof, and hence reduce the voltage across the associated primary winding, and the reduced voltage across the associated primary winding causes voltage to be developed in the associated additional winding which tends to further inhibit base current in the associated switching transistor.

25. The combination of claim 8 wherein said pulse generating means includes reference voltage means for developing a substantially constant reference voltage during operation of said pulse generating means, said pulse generating means being operable to develop pulses at a frequency which is a function of the voltage difference between battery voltage and the voltage of said reference voltage means.

26. The combination of claim 25 wherein said reference voltage means comprises a Zener diode.

* * * * *